US011073405B2

(12) United States Patent
Kline et al.

(10) Patent No.: US 11,073,405 B2
(45) Date of Patent: Jul. 27, 2021

(54) COMPARATIVE PRIORITY AND TARGET DESTINATION BASED LANE ASSIGNMENT OF AUTONOMOUS VEHICLES

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 16/023,561

(22) Filed: Jun. 29, 2018

(65) Prior Publication Data
US 2020/0003577 A1    Jan. 2, 2020

(51) Int. Cl.
G01C 21/36    (2006.01)
G05D 1/00    (2006.01)
G07C 5/00    (2006.01)
B60W 30/16    (2020.01)
G06K 9/00    (2006.01)

(52) U.S. Cl.
CPC ......... *G01C 21/3658* (2013.01); *B60W 30/16* (2013.01); *G01C 21/3602* (2013.01); *G05D 1/0088* (2013.01); *G06K 9/00798* (2013.01); *G07C 5/008* (2013.01); *G05D 2201/0213* (2013.01)

(58) Field of Classification Search
CPC ...... G08G 1/0116; H04W 4/40; H04W 88/16; H04W 76/14; H04W 88/04; H04W 40/00; H04W 4/46; G07C 5/008; H04L 67/12

USPC ....................................................... 701/401
See application file for complete search history.

(56) References Cited

U.S. PATENT DOCUMENTS 9,053,636 B2    6/2015 Gorgon
9,286,800 B2    3/2016 Gordon
9,404,761 B2    8/2016 Meuleau
9,534,918 B2    1/2017 Nemec et al.
(Continued)

FOREIGN PATENT DOCUMENTS

WO    2017218563 A1    12/2017

OTHER PUBLICATIONS

Ramamohanarao et al., From How to Where: Traffic Optimization in the Era of Automtated Vehicles (Vision Paper), Associattion for Computing Machinery, 2017, 4 pages.
(Continued)

*Primary Examiner* — Jonathan M Dager
*Assistant Examiner* — Jean W Charleston
(74) *Attorney, Agent, or Firm* — Cantor Colburn LLP; Tihon Poltavets

(57) ABSTRACT

Embodiments include a computer-implemented method, system and computer-program product for performing a comparative priority and target destination based lane assignment is provided. Embodiments include determining a number of lanes available for lane assignment, receiving target destination information for one or more vehicles, and receiving vehicle information from the one or more vehicles. In addition, the embodiments include determining location information for the one or more vehicles, and assigning the one or more vehicles based at least in part on the target destination information and the vehicle information.

13 Claims, 7 Drawing Sheets

(56) References Cited

U.S. PATENT DOCUMENTS

| | | | |
|---|---|---|---|
| 9,547,986 B1 | 1/2017 | Curlander et al. | |
| 9,672,734 B1* | 6/2017 | Ratnasingam | G08G 1/0968 |
| 10,243,415 B1* | 3/2019 | Grundmann | H02J 50/05 |
| 2014/0236414 A1* | 8/2014 | Droz | G08G 1/166 |
| | | | 701/28 |
| 2015/0321665 A1* | 11/2015 | Pandita | B60W 30/0956 |
| | | | 701/409 |
| 2017/0276492 A1* | 9/2017 | Ramasamy | G08G 1/096758 |
| 2018/0032082 A1* | 2/2018 | Shalev-Shwartz | |
| | | | B60W 30/0953 |
| 2018/0037227 A1* | 2/2018 | D'sa | B60W 50/045 |

OTHER PUBLICATIONS

Roncoli et al., "Traffic flow optimisation in presence of vehicle automation and communication systems—Part II: Optimal control for multi-lane motorways" Transportation Research Part C 57, 2015, pp. 260-275.

* cited by examiner

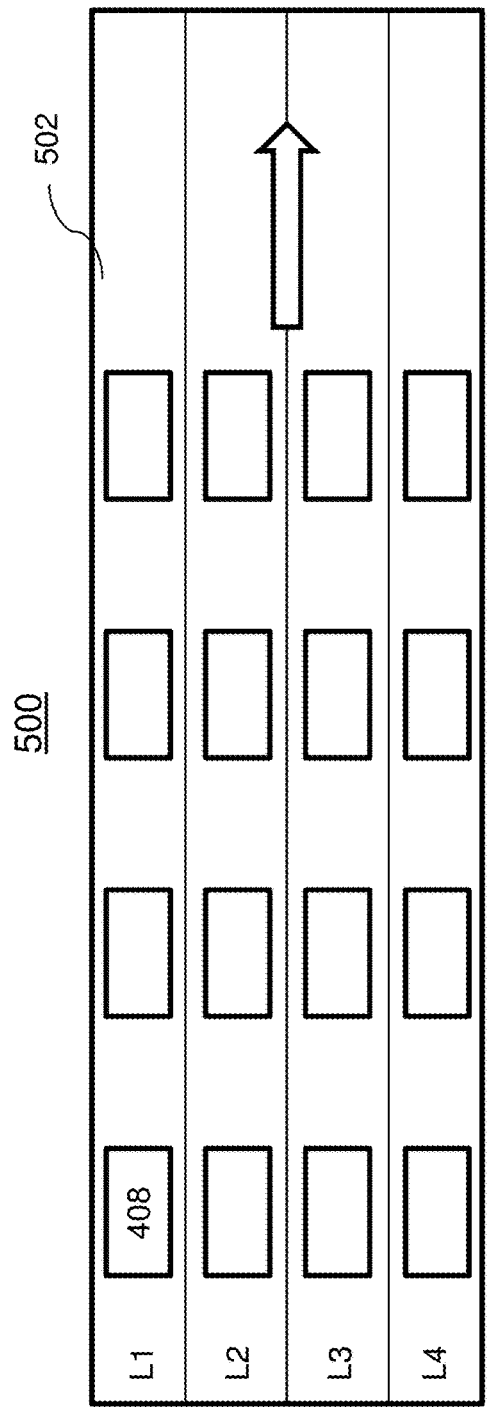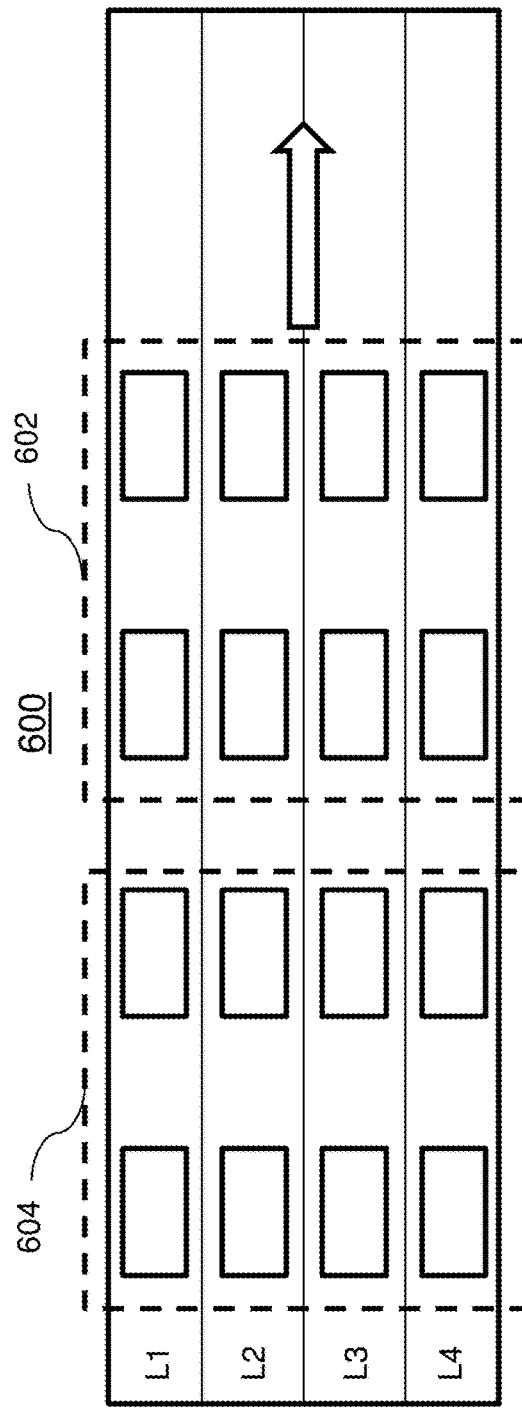

US 11,073,405 B2

COMPARATIVE PRIORITY AND TARGET DESTINATION BASED LANE ASSIGNMENT OF AUTONOMOUS VEHICLES

BACKGROUND

The present invention generally relates to autonomous vehicles, and more specifically, to comparative priority and target destination based lane assignment of autonomous vehicles.

In today's environment, many vehicles include navigation systems which help users plan routes from a starting point to a targeted destination. For those vehicles that do not have navigation systems integrated into their vehicles many users rely on applications on their mobile devices to retrieve the routing information. Oftentimes the traffic information and estimated time arrival information are provided to allow users to select routes that best fit their needs. In the event a user gets off course, an updated route can be dynamically updated and provided to them. Although users are able to obtain routing and traffic information, disruptions do to accidents and congestion caused by other vehicles can occur.

SUMMARY

Embodiments of the present invention are directed to a computer-implemented method for comparative priority and target destination based lane assignment in autonomous vehicles. A non-limiting example of the computer-implemented method includes determining a number of lanes available for lane assignment to one or more vehicles, receiving target destination information for each of the one or more vehicles, and receiving vehicle information associated with each of the one or more vehicles, wherein the vehicle information indicates at least one of vehicle identification information, vehicle type information, or passenger information. The computer-implemented method includes determining location information for each of the one or more vehicles, and assigning each of the one or more vehicles to a lane from the determined number of lanes available for lane assignment, based at least in part on the target destination information, the vehicle information, and the location information.

Embodiments of the present invention are directed to a system for comparative priority and target destination based lane assignment in autonomous vehicles. A non-limiting example of the system includes a processor coupled to a memory, where the processor is configured to determine a number of lanes available for lane assignment to one or more vehicles, receive target destination information for each of the one or more vehicles, and receive vehicle information associated with each of the one or more vehicles, wherein the vehicle information indicates at least one of vehicle identification information, vehicle type information, or passenger information. The processor is further configured to determine location information for each of the one or more vehicles, and assign each of the one or more vehicles to a lane from the determined number of lanes available for lane assignment, based at least in part on the target destination information, the vehicle information, and the location information.

Embodiments of the invention are directed to a computer program product for comparative priority and target destination based lane assignment in autonomous vehicles, the computer program product comprising a computer readable storage medium having program instructions embodied therewith. The program instructions are executable by a processor to cause the processor to perform a method. A non-limiting example of the method includes determining a number of lanes available for lane assignment to one or more vehicles, receiving target destination information for each of the one or more vehicles, and receiving vehicle information associated with each of the one or more vehicles, wherein the vehicle information indicates at least one of vehicle identification information, vehicle type information, or passenger information. The method includes determining location information for each of the one or more vehicles, and assigning each of the one or more vehicles to a lane from the determined number of lanes available for lane assignment, based at least in part on the target destination information, the vehicle information, and the location information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts an assignment according to a comparative priority and target destination based lane assignment in autonomous vehicles in accordance with one or more embodiments;

FIG. 6 depicts another assignment according to a comparative priority and target destination based lane assignment in autonomous vehicles in accordance with one or more embodiments;

Figure 1:
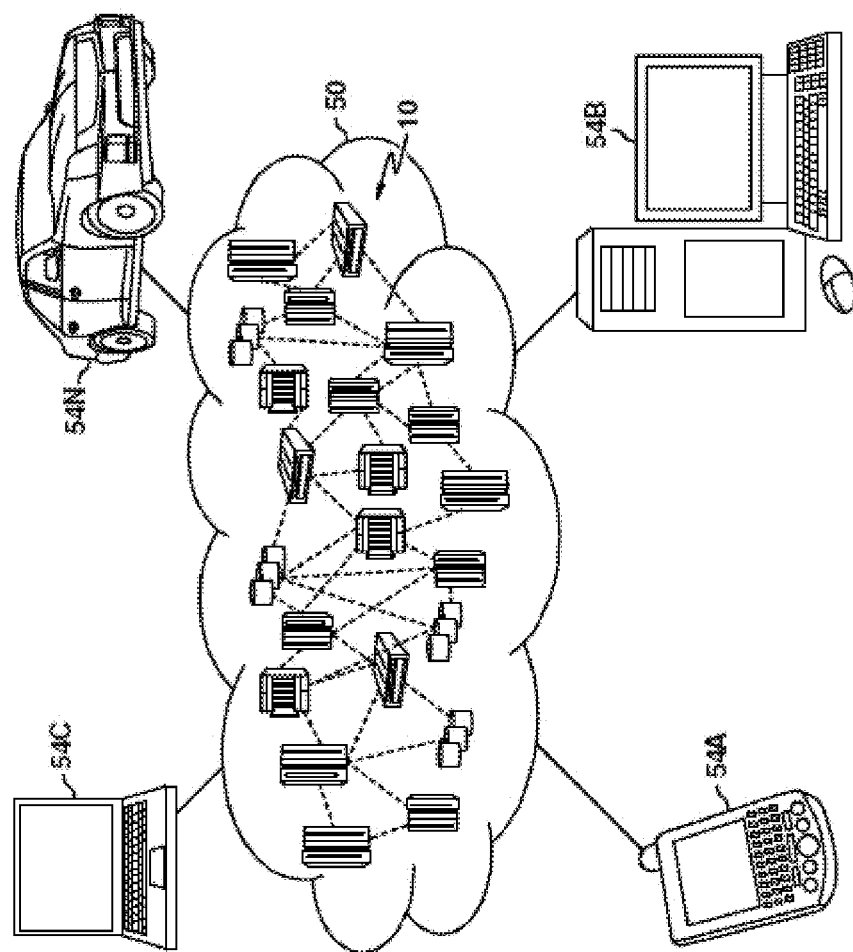
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
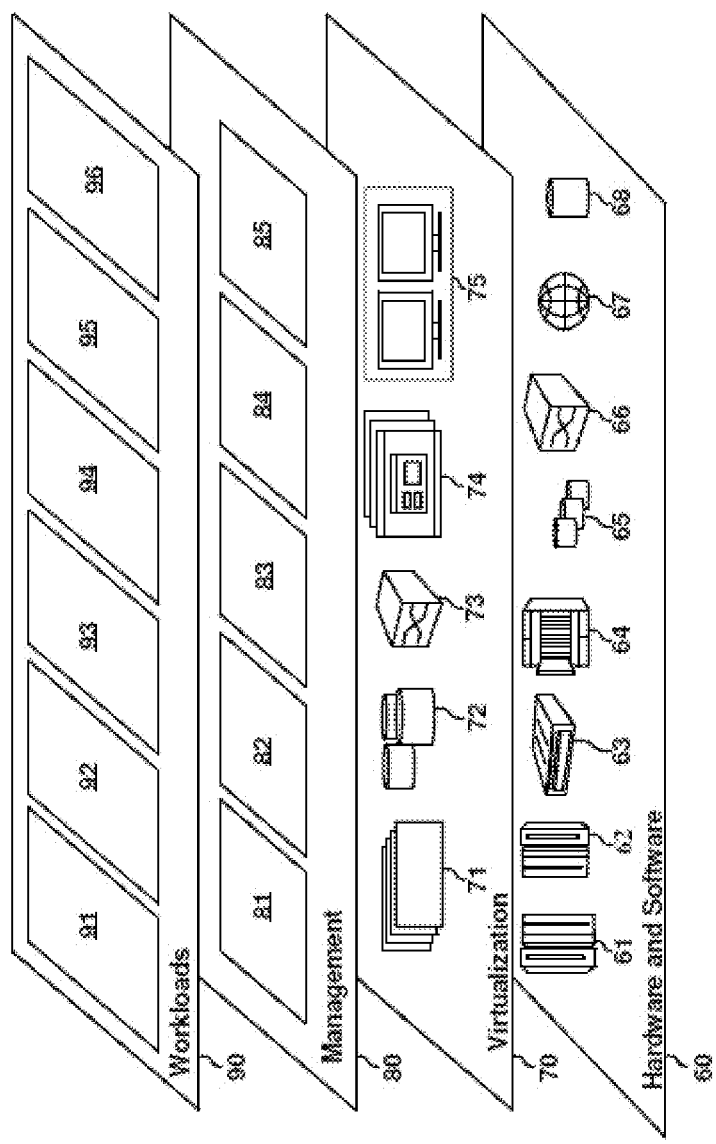
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other systems.

Figure 3:
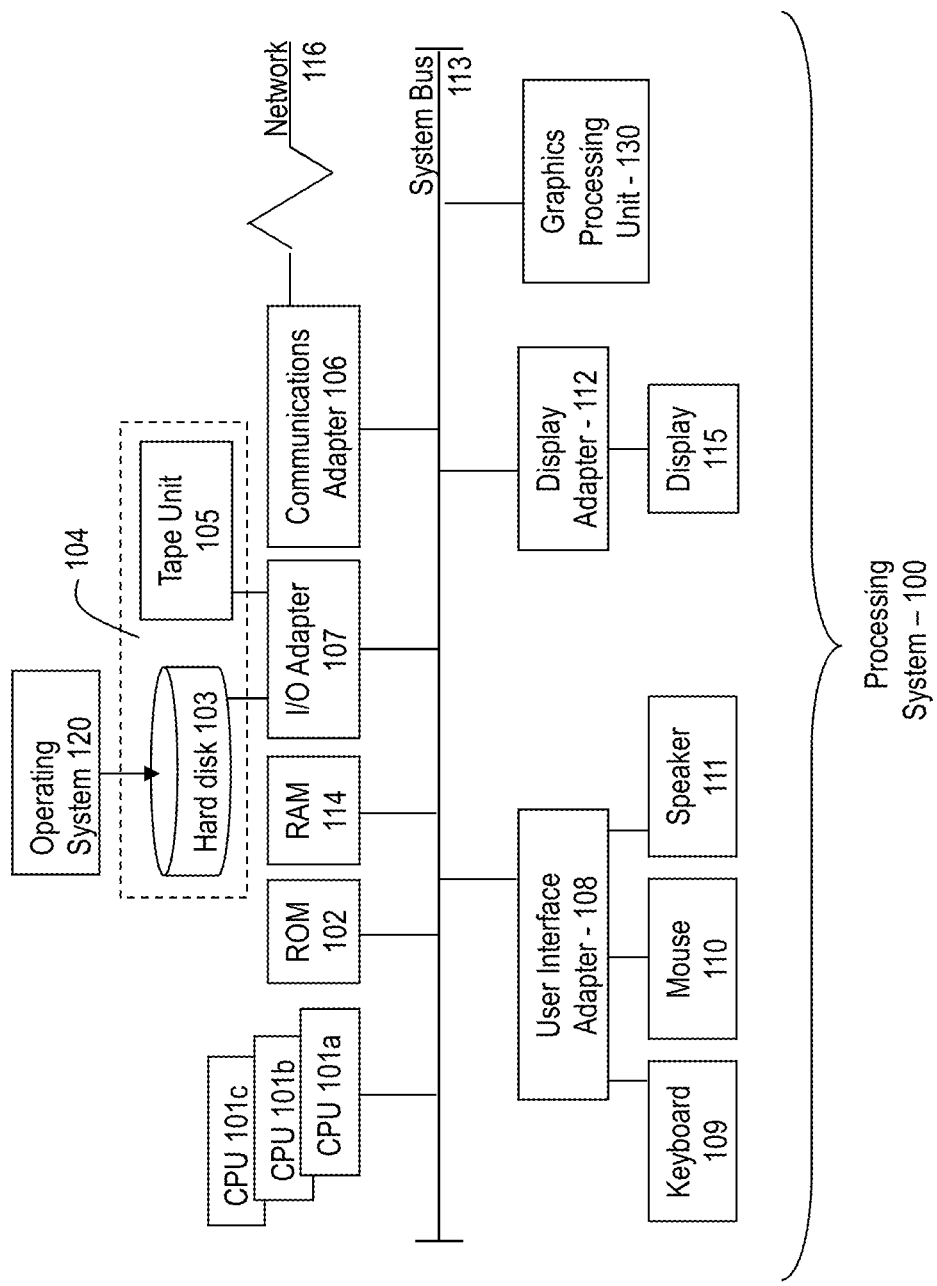
FIG. 3 depicts a system for practicing the techniques described herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Turning now to an overview of technologies that are more specifically relevant to aspects of the invention, autonomous vehicles provide a mechanism for transporting passengers and cargo between a current position and a selected target destination. This can be a viable mode of transportation because these vehicles can operate around the clock and are only limited by their energy sources.

Inconsistent flow of vehicles is a major source of traffic and congestion. In addition, unpredictable traffic can lead to high stress and unsafe driving conditions. Frequent changes in relative position and lane selection cause multiple disruptions in traffic. These changes cause other vehicles to slow down, stop, etc. which directly impacts the traffic flow experienced by other vehicles in the area. Managing the relative position and lane selections of traveling vehicles are critical to regulating the flow of traffic.

Turning now to an overview of the aspects of the invention, one or more embodiments of the invention address the above-described shortcomings of the prior art by providing techniques for logically clustering vehicles to level the flow of traffic and minimize traffic disruptions by providing assignments based on the distance from the target destination and priority information of each of the vehicles. A remote server can be used to assign the appropriate lane and relative position of the vehicles in a proactive manner so as to reduce such disruptions in the traffic caused by lane changes and direction of vehicles. In addition, the autonomous vehicles are capable of communicating with surrounding vehicles and are also configured to communicate with the remote server to obtain supplemental contextual data such as change of lanes, directional information, stopping, etc. Based on the collected data, driving patterns of impacted vehicles can be changed. In a non-limiting example, the speed of vehicles within proximity can be slowed down or caused to wait to allow other vehicles to move, etc.

The above-described aspects of the invention address the shortcomings of the prior art by logically clustering vehicles to assign relative positions and lanes to each of the vehicles. The clustering technique minimizes the number of lane changes and controls the spacing of vehicles which increase the safety of those passengers traveling on the roads.

Figure 4:
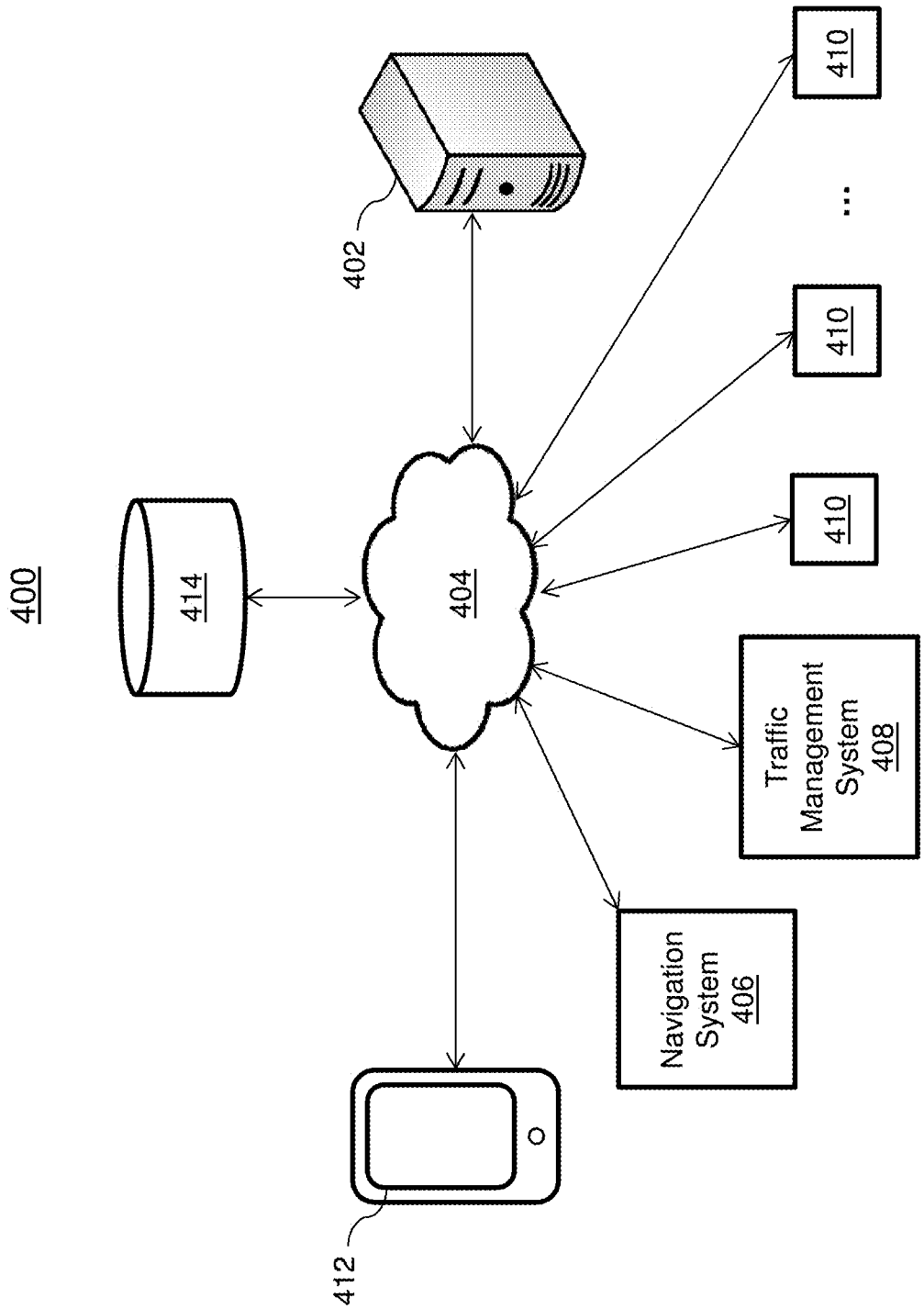
FIG. 4 depicts a system for performing comparative priority and target destination based lane assignment in autonomous vehicles in accordance with one or more embodiments.

Turning now to a more detailed description of aspects of the present invention, FIG. 4 illustrates a system 400 for implementing a comparative priority and target destination based lane assignment in accordance with one or more embodiments. The system 400 can be implemented in any one or more of the elements shown in FIG. 1-3.

As shown in FIG. 4 the system 400 includes a remote server 402 for performing comparative priority and target destination based lane assignment is provided. The remote server 402 is configured to communicate with multiple systems through a network 404. Different portions of the network 404 can be configured to communication over a wired and/or wireless connection. The remote server 402 is operably coupled to a navigation system 406, traffic management system 408 and one or more vehicles 410 over a network 404. The navigation system 406 is configured to provide routing information upon which the lane assignment is performed. In one or more embodiments of the invention, each of the vehicles can be equipped with sensors for providing location information to the navigation system 406 such a global positioning systems.

The traffic management system 408 is configured to provide the traffic information including congestion data and congestion prediction information such as road closures and accidents. It should be understood that other techniques can be used to obtain traffic information such as receiving updates from users currently located in traffic or other input sources.

The remote server 402 is also configured to communicate with one or more vehicles 410. The data received from the vehicles can include vehicle identification information, vehicle type information, passenger data, etc. In addition, information associated with a priority or class information can be used to determine a lane assignment. Vehicle type information can include shared pool type vehicles, emergency vehicles, personal vehicles, public transportation vehicle and the like. The passenger data can include information indicating the type of passenger onboard such as a doctor or emergency responder.

The system 400 is also operably configured to receive data from other sources such as user devices 412, administrators, operators, and other sources 414. Supplemental input can include data such as rules associated with the local laws and ordinances. For example, lanes that are assigned to high occupancy vehicles such as those having three or more passengers, highway speed limit information, etc.

The lane assignment performed by the system 400 assigns vehicles to the lanes based on target destination information including nearest stopping point and the estimated duration of stopping. The position assignment within each lane can be based on a vehicle type, priority, classification, an associated group of vehicles, etc. For example, the relative position of different types of vehicles in different lanes can be dynamically assigned based on a predefined relationship among the types of vehicles. A celebrity that is travelling in a vehicle with other escorting vehicles such as security team, medical personnel, other staff, can be assigned in together in the same group.

Vehicles can be equipped with sensors (not shown) to determine their position within the lane and also their distance from surrounding vehicles. The distance information can be transmitted to the remote server 402 to determine a distance that should be maintained between the vehicles to minimize safety and to minimize disruptions. Vehicle speed can be correlated to the spacing between other vehicles within proximity. For example, when traveling at higher speeds the distance between the vehicles can be greater than when traveling at slower speeds. In another embodiment, the spacing can be controlled to anticipate a lane change from another lane or the addition of another vehicle entering the highway to implements a smooth transition.

In addition, the speed is the vehicles 410 can be controlled to minimize traffic disruption to maintain space to allow cars that are approaching an exit to move in the designated positions.

With reference now to FIG. 5, an assignment 500 using comparative priority and target destination based lane assignment in accordance with one or more embodiments is shown. As shown in FIG. 4, a four lane highway 502 is illustrated having lanes L1-L4. In this non-limiting example, the system 400 has determined that the highway is a four lane highway where the first lane L can be assigned to vehicles that are closest to their destination and will be exiting the freeway. In the event, the exit from the highway is a right exit, the vehicles can be assigned to lane L4. In the event, only left exits are available, the lane L4 can be assigned to vehicles that are furthest away from their destinations where no vehicles will be stopped in that lane.

Also, lanes L2 and L3 can be assigned to vehicles that are not stopping or turning for a predetermined distance. For example, vehicles can be assigned to lane L2 that do not have an expected turn in the next 10 miles, while vehicles assigned to L3, are not expected to turn in the next 5 miles.

Referring now to FIG. 6, an assignment 600 using comparative priority and target destination based lane assignment in accordance with one or more embodiments is shown.

A four lane highway having lanes L1-L4 similar to that shown in FIG. 5 is shown. The vehicles 410 located in the front region 602 of the assignment vehicles are prioritized over the remaining assigned vehicles. The vehicles located in the back region 604 are assigned according to the techniques described above, wherein the vehicles 410 are assigned to the lanes based at least in part on a distance to their respective destinations and/or exits from the highway. As vehicles reach their destination and/or exit the highway the assignments can be updated based on the available locations in the cluster.

Figure 7:
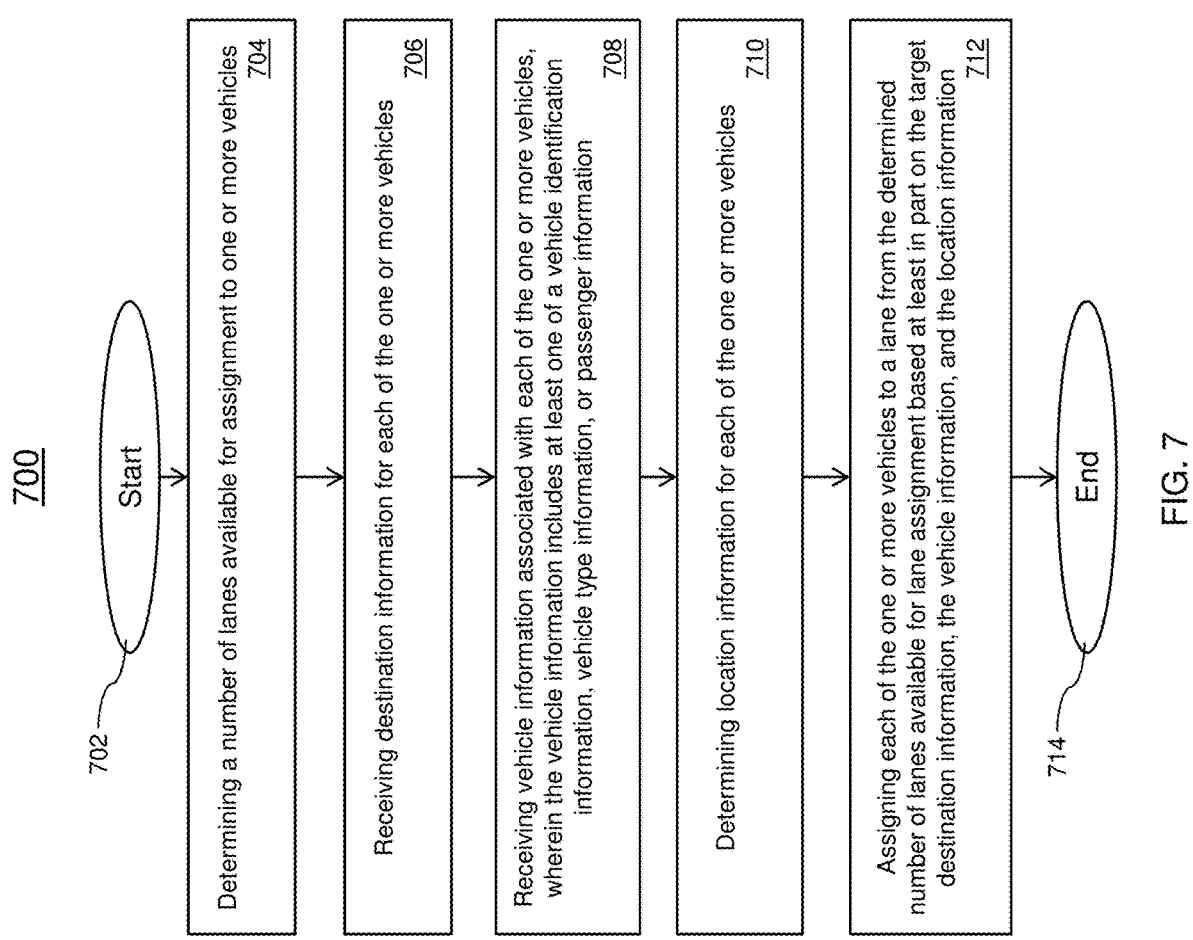
FIG. 7 depicts a method for performing a comparative priority and target destination based lane assignment in autonomous vehicles in accordance with one or more embodiments.

Now referring to FIG. 7, a method 700 for a comparative priority and target destination based lane assignment in accordance with one or more embodiments is shown. The method 700 can be executed in any of the system provided in FIGS. 1-4. The method 700 begins at block 702 and continues to block 704 which provides for determining a number of lanes available for lane assignment to one or more vehicles. In some embodiments of the invention, roads and highways may be closed due to construction or an accident. After determining the available lanes the method 700 proceed to block 706.

At block 706, the method 700 provides for receiving target destination information for each of the one or more vehicles. In one or more embodiments of the invention, the target destination can be input into the system from a user application or other interface. At block 708, the method 700 provides for receiving vehicle information associated with each of the one or more vehicles, wherein the vehicle information indicates at least one of vehicle identification information, vehicle type information, or passenger information. The vehicle information can include a vehicle identifier information, vehicle type information, vehicles traveling together, etc. The vehicle type information can indicate a high occupancy vehicle such as a bus, or an emergency vehicle such as an ambulance or police car.

At block 710, the method 700 includes determining location information for each of the one or more vehicles. The location of a vehicle indicates can be used to determine the current spacing information between the vehicles in proximity. The method 700 continues to block 712 and provides for assigning each of the one or more vehicles to a lane from the determined number of lanes available for lane assignment, based at least in part on the target destination information, the vehicle information, and the location information. In one or more embodiments of the invention, vehicles are assigned to a lane of a plurality of lanes. In a non-limiting example, lane assignments can be based on a distance to a destination.

Vehicles can also be assigned to a position with in assigned lane based on a priority associated with the vehicle. Vehicles having a higher priority can be assigned towards the front of the assigned vehicles, such as emergency vehicles, fire trucks, or police cars. In addition, the distance between the vehicles in a lane can be managed by the system 400 responsive to receiving data from the vehicles or data from the navigation system. In addition, vehicles that are associated with one another can be grouped together and assigned to the lanes and positions as a group within the cluster. In one or more embodiments of the invention, as vehicles reach the destination, the assignment of vehicles can be dynamically reassigned based on the current conditions. The method 700 ends at block 714.

Figure 8:
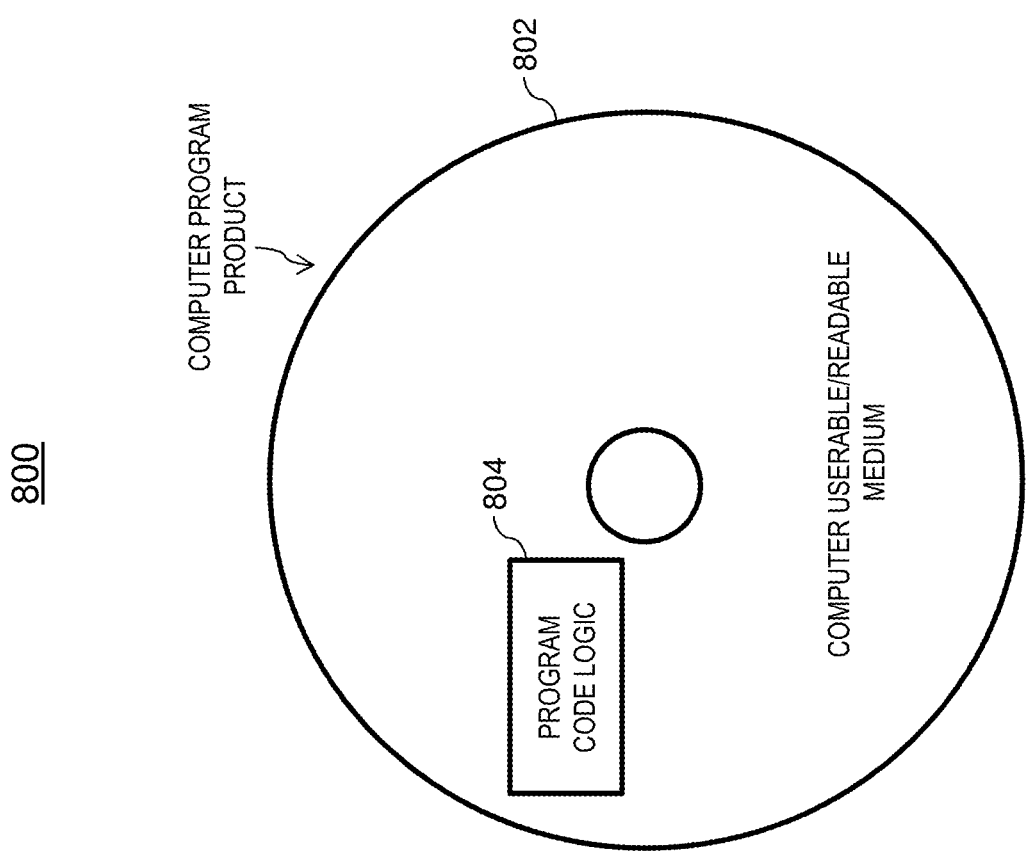
FIG. 8 depicts a computer program product in accordance with one or more embodiments of the invention.

Referring now to FIG. 8, a computer program product 800 in accordance with an embodiment that includes a computer readable storage medium 802 and program instructions 804 is generally shown.

The invention improves over the prior art by increasing the safety for passengers and reducing traffic disruptions caused by unpredictable traffic flow. The techniques also improve over the prior art by assigning vehicles to lanes and prioritizing the vehicles within the lanes based on the distance to the target destination and priority data, to reduce traffic congestion caused by disruptions in lane changes. In addition, vehicles are configured to exchange information between one another to dynamically adapt the assignments. By clustering the vehicles in blocks of similarly situated vehicles these and other improvements can be realized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for a comparative priority and target destination based lane assignment, the computer-implemented method comprising:

determining a number of lanes available for lane assignment to one or more vehicles;

receiving target destination information for each of the one or more vehicles;

receiving vehicle information associated with each of the one or more vehicles, wherein the vehicle information indicates at least one of vehicle identification information, vehicle type information, or passenger information;

determining location information for each of the one or more vehicles; and assigning each of the one or more vehicles to a lane from the determined number of lanes available for lane assignment, based at least in part on the target destination information, the vehicle information, and the location information;

responsive to assigning each of the one or more vehicles to the lane, further assigning each of the one or more vehicles to a position in an ordered sequence among the assigned one or more vehicles within the assigned lane, wherein the assigned position is based at least in part on a priority associated with the one or more vehicles, wherein the assigned one or more vehicles associated with a high priority are positioned in a front position of the assigned lane.

2. The computer-implemented method of claim 1, wherein assigning the one or more vehicles to a lane is based at least in part on a distance from the target destination.

3. The computer-implemented method of claim 1, further comprising controlling a spacing between one or more vehicles based at least in part on contextual information.

4. The computer-implemented method of claim 1, wherein the priority is associated with a passenger in the one or more vehicles.

5. The computer-implemented method of claim 1, wherein vehicles are assigned in clusters based at least in part on being associated with other vehicles.

6. A system for a comparative priority and target destination based lane assignment, the system comprising:
   a storage medium, the storage medium being coupled to a processor;
   the processor configured to:
      determine a number of lanes available for lane assignment to one or more vehicles;
      receive target destination information for each of the one or more vehicles;
      receive vehicle information associated with each of the one or more vehicles, wherein the vehicle information indicates at least one of vehicle identification information, vehicle type information, or passenger information;
      determine location information for each of the one or more vehicles; and
      assign each of the one or more vehicles to a lane from the determined number of lanes available for lane assignment, based at least in part on the target destination information, the vehicle information, and the location information;
      responsive to assigning each of the one or more vehicles to the lane, further assign each of the one or more vehicles to a position in an ordered sequence among the one or more vehicles within the assigned lane, wherein the assigned position is based at least in part on a priority associated with the one or more vehicles, wherein the assigned one or more vehicles associated with a high priority are positioned in a front position of the assigned lane.

7. The system of claim 6, wherein assigning the one or more vehicles to a lane is based at least in part on a distance from the target destination.

8. The system of claim 6, further comprising controlling a spacing between one or more vehicles based at least in part on contextual information.

9. The system of claim 6, wherein the priority is associated with a passenger in the one or more vehicles.

10. The system of claim 6, wherein vehicles are assigned in clusters based at least in part on being associated with other vehicles.

11. A computer program product for comparative priority and target destination based lane assignment, the computer program product comprising:
   a computer readable storage medium having stored thereon program instructions executable by a processor to cause the processor to:
      determine a number of lanes available for lane assignment to one or more vehicles;
      receive target destination information for each of the one or more vehicles;
      receive vehicle information associated with each of the one or more vehicles, wherein the vehicle information indicates at least one of vehicle identification information, vehicle type information, or passenger information;
      determine location information for each of the one or more vehicles; and
      assign each of the one or more vehicles to a lane from the determined number of lanes available for lane assignment, based at least in part on the target destination information, the vehicle information, and the location information;
      responsive to assigning each of the one or more vehicles to the lane, further assign each of the one or more vehicles to a position in an ordered sequence among the one or more vehicles within the assigned lane, wherein the assigned position is based at least in part on a priority associated with the one or more vehicles, wherein the assigned one or more vehicles associated with a high priority are positioned in a front position of the assigned lane.

12. The computer program product of claim 11, wherein assigning the one or more vehicles to a lane is based at least in part on a distance from the target destination.

13. The computer program product of claim 11, wherein the instructions are further executable by the processor to cause the processor to control a spacing between one or more vehicles.

* * * * *